(12) United States Patent
Diazzi et al.

(10) Patent No.: US 12,385,740 B2
(45) Date of Patent: Aug. 12, 2025

(54) SENSOR SYSTEM AND METHOD FOR COMPENSATING FOR AN OFFSET OF AN ANGULAR RATE SIGNAL

(71) Applicant: Robert Bosch GmbH, Stuttgart (DE)

(72) Inventors: Francesco Diazzi, Munich (DE); Andrea Visconti, Munich (DE); Ruslan Khalilyulin, Munich (DE)

(73) Assignee: ROBERT BOSCH GMBH, Stuttgart (DE)

( * ) Notice: Subject to any disclaimer, the term of this patent is extended or adjusted under 35 U.S.C. 154(b) by 246 days.

(21) Appl. No.: 18/000,774

(22) PCT Filed: Aug. 27, 2021

(86) PCT No.: PCT/EP2021/073758
§ 371 (c)(1),
(2) Date: Dec. 5, 2022

(87) PCT Pub. No.: WO2022/053337
PCT Pub. Date: Mar. 17, 2022

(65) Prior Publication Data
US 2023/0213340 A1    Jul. 6, 2023

(30) Foreign Application Priority Data
Sep. 9, 2020  (DE) .................. 10 2020 211 317.3

(51) Int. Cl.
*G01C 19/5755* (2012.01)
*G01C 19/5712* (2012.01)
(Continued)

(52) U.S. Cl.
CPC ..... *G01C 19/5755* (2013.01); *G01C 19/5712* (2013.01); *G01C 19/5726* (2013.01); *G01C 19/5776* (2013.01)

(58) Field of Classification Search
CPC ........... G01C 19/5755; G01C 19/5712; G01C 19/5726; G01C 19/5776
See application file for complete search history.

(56) References Cited

U.S. PATENT DOCUMENTS

| | | |
|---|---|---|
| 7,290,435 B2 | 11/2007 | Seeger et al. |
| 9,410,806 B2 | 8/2016 | Ezekwe |
| | (Continued) | |

FOREIGN PATENT DOCUMENTS

| | | |
|---|---|---|
| EP | 692698 A1 | 1/1996 |
| JP | H1144540 A | 2/1999 |
| | (Continued) | |

OTHER PUBLICATIONS

International Search Report for PCT/EP2021/073758, Issued Dec. 22, 2021.

*Primary Examiner* — Ryan D Walsh
(74) *Attorney, Agent, or Firm* — NORTON ROSE FULBRIGHT US LLP

(57) ABSTRACT

A sensor system. The sensor system comprises a MEMS gyroscope, comprising at least: a seismic mass, which can be excited to vibrate and has at least one electrode assembly for capacitively detecting a measurement signal, a drive circuit for generating a drive voltage for exciting and maintaining a defined vibratory movement of the seismic mass, there being a parasitic capacitive coupling between the drive circuit and the at least one electrode assembly, a detection circuit for reading out the measurement signal and for generating an angular rate signal on the basis of the measurement signal, characterized by circuitry means for compensating for an offset of the angular rate signal on the basis of the drive voltage.

11 Claims, 2 Drawing Sheets

(51) Int. Cl.
  *G01C 19/5726*  (2012.01)
  *G01C 19/5776*  (2012.01)

(56) References Cited

U.S. PATENT DOCUMENTS

| | | | |
|---|---|---|---|
| 11,680,798 B2* | 6/2023 | Avantaggiati | G01C 19/5712 |
| | | | 73/504.12 |
| 12,031,821 B2* | 7/2024 | Visconti | G01C 19/5776 |
| 2015/0057959 A1 | 2/2015 | Ezekwe | |
| 2017/0254645 A1* | 9/2017 | Kanemoto | G01C 19/5712 |
| 2017/0307374 A1 | 10/2017 | Hughes | |
| 2019/0137272 A1* | 5/2019 | Visconti | G01C 19/5776 |
| 2019/0265036 A1 | 8/2019 | Arndt et al. | |
| 2022/0074746 A1* | 3/2022 | Diazzi | G01C 19/5776 |

FOREIGN PATENT DOCUMENTS

| | | |
|---|---|---|
| JP | 2008070229 A | 3/2008 |
| JP | 5181449 B2 | 4/2013 |

\* cited by examiner

SENSOR SYSTEM AND METHOD FOR COMPENSATING FOR AN OFFSET OF AN ANGULAR RATE SIGNAL

FIELD

The present invention relates to a sensor system.

BACKGROUND INFORMATION

Gyroscopes formed as microelectromechanical systems (MEMS) are used as sensors in a multiplicity of electrical devices and applications.

In this case, the offset precision of the sensors and the temperature fluctuation of the offset are key parameters for enabling high-power applications. In MEMS gyroscopes, the quadrature demodulation error is crucial to the offset. There are thus various approaches for implementing a precise demodulation and for directly compensating for the phase demodulation error or the quadrature signal. One conventional architecture, used in open-loop gyroscopes, entails compensating for the quadrature signal at the frontend input of the detection circuit using a signal derived from the drive movement, as described for example in U.S. Pat. No. 7,290,435 B2. Techniques of this kind can be combined with a zero-rate output (ZRO) compensation, in which the raw rate signal is combined with a properly scaled version of the quadrature signal. U.S. Pat. No. 9,410,806 B2 describes a ZRO compensation of this kind. U.S. Patent Application Publication No. US 2019/0265036 A1 describes a direct combination of the two techniques.

MEMS gyroscopes are capacitive sensor types. Parasitic capacitive couplings are thus another cause of offsets. In this case, one source of offset errors owing to parasitic capacitive coupling in a gyroscope may be the coupling of the drive circuit to the detection; this may occur due to parasitic capacitances between the electrodes, electrical lines, and bond wires. During application, attempts are made to minimize this effect by shielding and perfect symmetry. In practice, however, there is typically still a residual error. Given the constantly advancing miniaturization in order to reduce costs and integrate sensors in smaller Internet-of-Things (IOT) devices, said residual error is becoming ever more critical.

SUMMARY

An object of the present invention is to provide a sensor system using which offset errors can be reduced in a particularly advantageous manner.

Compared with the related art, an advantage of the sensor system according to the present invention is that the offset of an angular rate signal can be precisely compensated for. In particular, according to the present invention it is advantageously possible to effectively correct an offset in the angular rate signal caused by parasitic capacitive coupling between the drive means (i.e., a drive) and the detection means (i.e., a detector) of the gyroscope.

Generally speaking, in practice there may be a parasitic capacitive coupling between the drive means and the electrode assembly for detecting the measurement signal, in particular by way of a capacitive coupling between capacitors in the MEMS, the bond wires, and/or the electrical lines.

The angular rate signal of the gyroscope is in phase with the velocity of the vibrating seismic mass of the gyroscope. The drive signal for driving the vibrating mass is likewise in phase with the velocity of the seismic mass, and thus in phase with the angular rate. The parasitic injection of charge, caused by the drive voltage, into the electrode assembly for detecting the measurement signal is thus detected in the detection circuit in an equivalent manner to the angular rate. Consequently, the angular rate signal may comprise a parasitic offset induced by the drive voltage. According to an example embodiment of the present invention, it is particularly advantageously possible to compensate for an angular rate signal offset induced in this manner. In this case, the compensation makes it possible to equalize the offset at room temperature, but also allows the offset variation or change to be tracked and compensated for as a function of the temperature since the drive voltage is typically within a control loop and changes (or is changed) with the temperature so that the movement of the vibrating mass retains a constant amplitude.

According to an example embodiment of the present invention, it is possible in particular to combine the offset compensation according to the present invention with other offset compensation methods, for example the quadrature compensation methods and phase compensation methods described at the outset and already available in the related art. By way of example, it is possible for the measurement signal from the gyroscope to comprise a quadrature signal that is phase-shifted in relation to the angular rate signal; in this case, in addition to compensating for the offset of the angular rate signal on the basis of the drive voltage, V_Act, the circuitry means (i.e., a circuit) are configured to compensate for a quadrature-induced offset of the angular rate signal on the basis of the quadrature signal.

Advantageous embodiments and developments of the present invention are disclosed herein.

Since, according to a specific embodiment of the present invention, the circuitry means are configured to apply the weighted or unweighted drive voltage, V_Act, to the analog angular rate signal, it is advantageously possible to compensate for the angular rate signal in the analog part of the detection circuit by way of or on the basis of the drive voltage, in particular before the angular rate signal is digitalized.

Since, according to a specific example embodiment of the present invention, the sensor system comprises a digital processing circuit configured to compensate for the offset of the digitalized angular rate signal on the basis of the digitalized drive voltage, it is advantageously possible to compensate for the angular rate signal in the digital backend by way of or on the basis of the digitalized drive voltage, in particular after the angular rate signal has been digitalized.

Since, according to a specific example embodiment of the present invention, the sensor system comprises at least one temperature sensor for detecting temperature information, and the digital processing circuit is configured to compensate for the offset of the digitalized angular rate signal additionally on the basis of the digitalized temperature information, T, particularly advantageous temperature-dependent compensation using temperature information and the drive voltage is possible. Precise compensation can thus be performed over a temperature range.

Since, according to a specific example embodiment of the present invention, the processing circuit is configured to apply a compensation offset, Rate_Offset, to the digitalized angular rate signal, the processing circuit being configured to generate the compensation offset, Rate_Offset, by linking the digitalized temperature information, T, and the digitalized drive voltage, V_Act, in accordance with a predetermined functional relationship, it is advantageously possible to obtain particularly advantageous sensor behavior in a multiplicity of applications in which the gyroscope may be exposed to temperature changes.

Since, according to a specific example embodiment of the present invention, the processing circuit is configured to apply a compensation offset, Rate_Offset, to the digitalized angular rate signal, the compensation offset being expressed as:

$$\text{Rate\_Offset} = (c0 + c1*T + c2*T^2) * V\_\text{Act},$$

where c0, c1, and c2 are coefficients determined in advance, it is particularly advantageously possible to compensate for the offset of the angular rate signal on the basis of settable and/or ascertainable coefficients and the ascertained temperature. In this case, the coefficients are in particular dependent on the specific sensor system and the respective parasitic capacitances.

Since, according to a specific example embodiment of the present invention, the MEMS gyroscope is configured for measurements in at least two independent directions in space by the MEMS gyroscope comprising at least two drivable seismic masses for detecting at least two measurement signals, wherein the at least two seismic masses are excited to move in a vibratory manner in respective independent directions in space and a shared drive circuit is provided for the at least two seismic masses, and by the MEMS gyroscope being configured such that at least two angular rate signals are generated for at least two independent directions in space on the basis of the at least two measurement signals, characterized in that, for the offset compensation, the circuitry means are configured to use the drive voltage generated by the shared drive circuit to compensate for the offset of the at least two angular rate signals, the offset being compensated for separately for each of the at least two angular rate signals, it is possible to obtain advantageous compensation for a two-axis or even three-axis gyroscope. In this case, the compensations are preferably specific to each axis and, in particular, are not identical. By way of example, it is possible that a first set of coefficients c0, c1, c2 is used for a first angular rate signal of a first axis of the gyroscope and that a second set of coefficients, different from the first set of coefficients, is used for a second angular rate signal of a second axis of the gyroscope. As a result, the parasitic capacitive couplings can, in a particularly advantageous manner, be taken into account and compensated for separately for the individual directions in space or axes of the gyroscope.

The present invention also relates to a method for compensating for an offset of an angular rate signal that has been detected and generated using a sensor system comprising a MEMS gyroscope, the MEMS gyroscope comprising at least:

a seismic mass, which can be excited to vibrate and has at least one electrode assembly for capacitively detecting a measurement signal, a drive circuit for generating a drive voltage, V_Act, for exciting and maintaining a defined vibratory movement of the seismic mass, there being a parasitic capacitive coupling between the drive circuit and the at least one electrode assembly, a detection circuit for reading out the measurement signal and for generating an angular rate signal on the basis of the measurement signal, characterized in that the offset compensation is based on the drive voltage, V_Act.

According to a specific example embodiment of the present invention, in particular of the method according to the present invention, the weighted or unweighted drive voltage, V_Act, is applied to the analog angular rate signal for the purpose of the offset compensation.

According to a specific example embodiment of the present invention, in particular of the method according to the present invention, temperature information is detected and digitalized and is used as the basis for compensating for the offset of the digitalized angular rate signal. The temperature information is preferably detected using a temperature sensor, digitalized using an analog-to-digital converter, and supplied to the digital processing circuit.

According to a specific example embodiment of the present invention, in particular of the method according to the present invention, a compensation offset, Rate_Offset, is applied to the digitalized angular rate signal, and the compensation offset, Rate_Offset, is generated by linking the digitalized temperature information, T, and the digitalized drive voltage, V_Act, in accordance with a predetermined functional relationship.

According to a specific example embodiment of the present invention, in particular of the method according to the present invention, the compensation offset, Rate_Offset, is determined as:

$$\text{Rate\_Offset} = (c0 + c1*T + c2*T^2) * V\_\text{Act},$$

where c0, c1, and c2 are coefficients determined in advance.

The advantages and example embodiments of the present invention that have already been described in connection with the sensor system according to the present invention or in connection with a specific embodiment of the sensor system according to the present invention can be applied to the method for compensating for an offset of an angular rate signal.

Exemplary embodiments of the present invention are shown in the figures and explained in more detail in the following description.

DETAILED DESCRIPTION OF EXAMPLE EMBODIMENT

In the various figures, like parts are provided with like reference signs and thus are also each generally only introduced or mentioned once.

Figure 1:
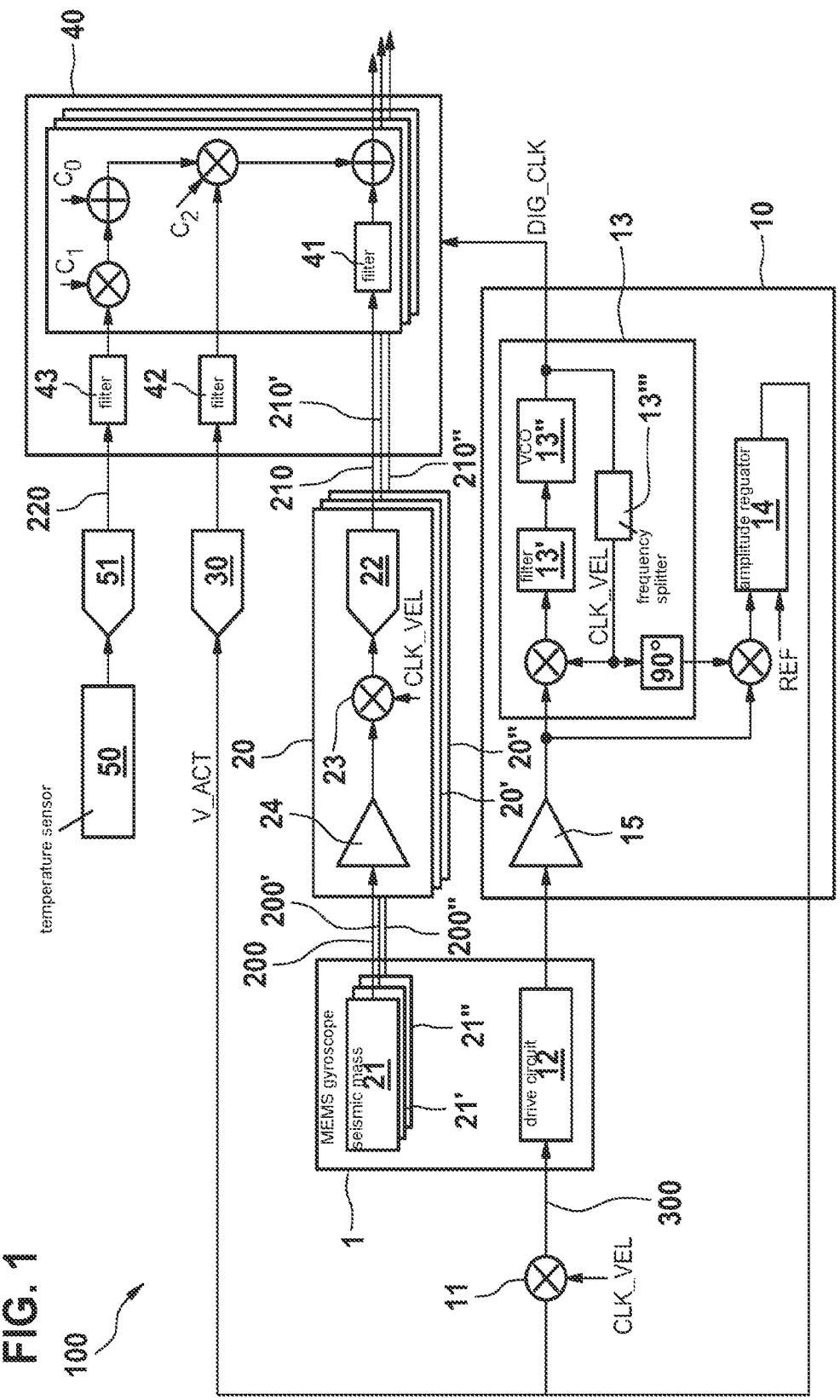
FIG. 1 is a schematic illustration of a sensor system according to a first exemplary embodiment of the present invention.

FIG. 1 is a schematic illustration of a sensor system 100 according to a first exemplary embodiment of the present invention. The sensor system 100 comprises a microelectromechanical gyroscope (MEMS gyroscope) 1 comprising a seismic mass 21 that can be excited to vibrate. In addition, the gyroscope comprises a second and a third seismic mass 21', 21" that can be excited to vibrate. By way of the masses 21, 21', 21", measurement signals 200, 200', 200" can be detected for three independent directions in space, and detection circuits 20, 20', 20" can obtain respective angular rate signals from the measurement signals 200, 200', 200" for the three directions in space. The angular rate signals can be digitalized and supplied to a digital processing circuit 40 as digitalized angular rate signals 210, 210', 210". The seismic masses 21, 21', 21" can be driven by way of a shared drive circuit 10.

In the following, the system will be described on the basis of the measurement signal 200 or digitalized angular rate signal 210, i.e., for one of the three detection axes. However, analogous compensation methods can be applied to the measurement signals 200', 200" from the other masses 21', 21", the compensation preferably being performed separately in each case for the three directions in space and three measurement signals 200, 200', 200", and in particular using discrete parameters in each case.

The sensor system 100 comprises a drive circuit 10 configured to generate a drive voltage, V_Act, for exciting and maintaining a defined vibratory movement of the seismic mass 21. On the basis of the drive voltage, V_Act, the drive signal 300 is generated in phase with a velocity of the mass 21, CLK_VEL, using corresponding circuitry means 11, 12, and is applied to the seismic mass 21 such that the seismic mass 21 is driven to vibrate. The drive circuit comprises a C/V converter 15, using which the drive movement of the drive mass is detected. A downstream phase-locked loop 13 (PLL) carries out a phase demodulation of the signal. The phase demodulation is carried out using a clock signal in phase with the velocity of the mass 21, CLK_VEL. The phase-locked loop 13 measures the frequency and the phase of the inputs and provides a closed loop. For this purpose, the phase-locked loop 13 may typically comprise a demodulation block (phase detector), a PLL filter 13', and a voltage-controlled oscillator 13" (VCO). The clock signal output by the VCO 13" is fed back to the phase detector by way of a frequency splitter (1/N) 13'''. The phase-locked loop 13 also provides the clock signal, DIG_CLK, for the digital processing circuit 40.

In addition, the drive circuit 10 comprises an amplitude regulator 14 for the purpose of the amplitude demodulation. The amplitude is demodulated using a signal that is in phase with the position of the mass 21, i.e., is phase-shifted through 90° in relation to the velocity of the mass 21, CLK_VEL. The amplitude regulator 14 compares the movement of the mass 21 with a reference, REF, and drives the mass 21 such as to retain a constant mass-vibration amplitude. The drive voltage, V_Act, output by the amplitude regulator 14 is then modulated in phase with the velocity of the mass 21, CLK_VEL, using circuitry means 11 and is applied to the seismic mass 21 as a drive signal 300. By way of example, the modulation may be carried out using a square wave signal or a sine wave signal.

The MEMS gyroscope 1 reacts to an applied angular rate via the Coriolis force, whereby a movement orthogonal to the drive movement and proportional to the velocity of the mass 21 is generated. The measurement signal 200 related to the seismic mass 21 is capacitively detected by at least one electrode assembly and supplied to the analog detection circuit 20 via a C/V converter 24. The angular rate signal is generated from the measurement signal 200 via demodulation using a demodulation apparatus 23. This demodulation is carried out in phase with the velocity of the mass 21, CLK_VEL. Using an analog-to-digital converter (ADC) 22, the obtained angular rate signal is digitalized and supplied to a digital processing circuit 40.

There is a parasitic capacitive coupling between the drive circuit 10, 11, 12 and the electrode assembly, which is configured to capacitively detect the measurement signal, and in particular between bond wires, electrical lines, and/or electrodes of the drive circuit 10, 11, 12 and the electrode assembly, so the drive voltage, V_Act, may induce a parasitic charge in the electrode assembly for the detection. In the process, and as described above, the drive voltage, V_Act, of the drive signal 300 is in phase with the velocity of the seismic mass 21, CLK_VEL, and thus in phase with the angular rate signal obtained from the measurement signal 200. Accordingly, as a result of the capacitive coupling between the drive circuit 10, 11, 12 and the electrode assembly, the drive voltage, V_Act, generates a parasitic offset in the angular rate signal since the two are each in phase with the velocity of the mass 21, CLK_VEL.

In the first exemplary embodiment shown in FIG. 1, the offset of the digitalized angular rate signal 210, i.e., after the angular rate signal has been digitalized, is compensated for on the basis of the digitalized drive voltage, V_Act. For this purpose, the angular rate signal generated in the detection circuit 20 is digitalized by the analog-to-digital converter 22 and filtered in the digital processing circuit 40 using a filter 41. The drive voltage, V_Act, output by the amplitude regulator 14 is digitalized by way of an analog-to-digital converter 30, filtered using a filter 42, and likewise supplied to the digital processing circuit 40. In addition, the compensation is performed using temperature information 220 that is detected by a temperature sensor 50 and digitalized and filtered using an analog-to-digital converter 51 and a filter 43. The digitalized temperature information obtained in this manner is supplied to the digital processing circuit 40. For the purpose of the offset compensation, the digital processing circuit 40 applies a compensation offset, Rate_Offset, to the digitalized angular rate signal. In particular, the compensation offset, Rate_Offset, can be obtained via the following relationship:

$$\text{Rate\_Offset} = (c0 + c1*T + c2*T^2)*V\_\text{Act},$$

where T is the temperature indicated by the temperature information, where c0, c1, and c2 are coefficients determined in advance. The coefficients c0, c1, c2 are typically specific to and, in particular, different for each of the axes of the gyroscope and thus for each of the measurement signals 200, 200', 200" of the different axes of the gyroscope since the parasitic capacitances for the different channels are typically not identical. Therefore, it is particularly advantageous if a separate set of coefficients c0, c1, c2 can be selected or is available for each channel of the gyroscope.

Alternatively to the first exemplary embodiment shown in FIG. 1, is it also possible to use the compensation principle according to the present invention in ASIC architectures, in which the demodulation for the drive and/or detection takes place in the digital domain, for example in the digital processing circuit 40. In this case, the analog-to-digital converter can, for example, be connected directly downstream of the C/V converter or even be directly connected to the detection electrodes. According to the present invention, therefore, the compensation of the offset on the basis of the drive voltage, V_Act, can be implemented regardless of the exact implementation of the signal detection, in particular regardless of the detection circuit and the digital processing circuit.

Alternative implementations for the drive circuit 10 are also possible. In the case of a drive controller architecture, in which the amplitude generator 14 is implemented in the digital domain, the digitalized drive voltage, V_Act, can be obtained directly by the controller or amplitude generator 14 in the digital domain, without there being any need for analog-to-digital conversion using the analog-to-digital converter 30.

Figure 2:
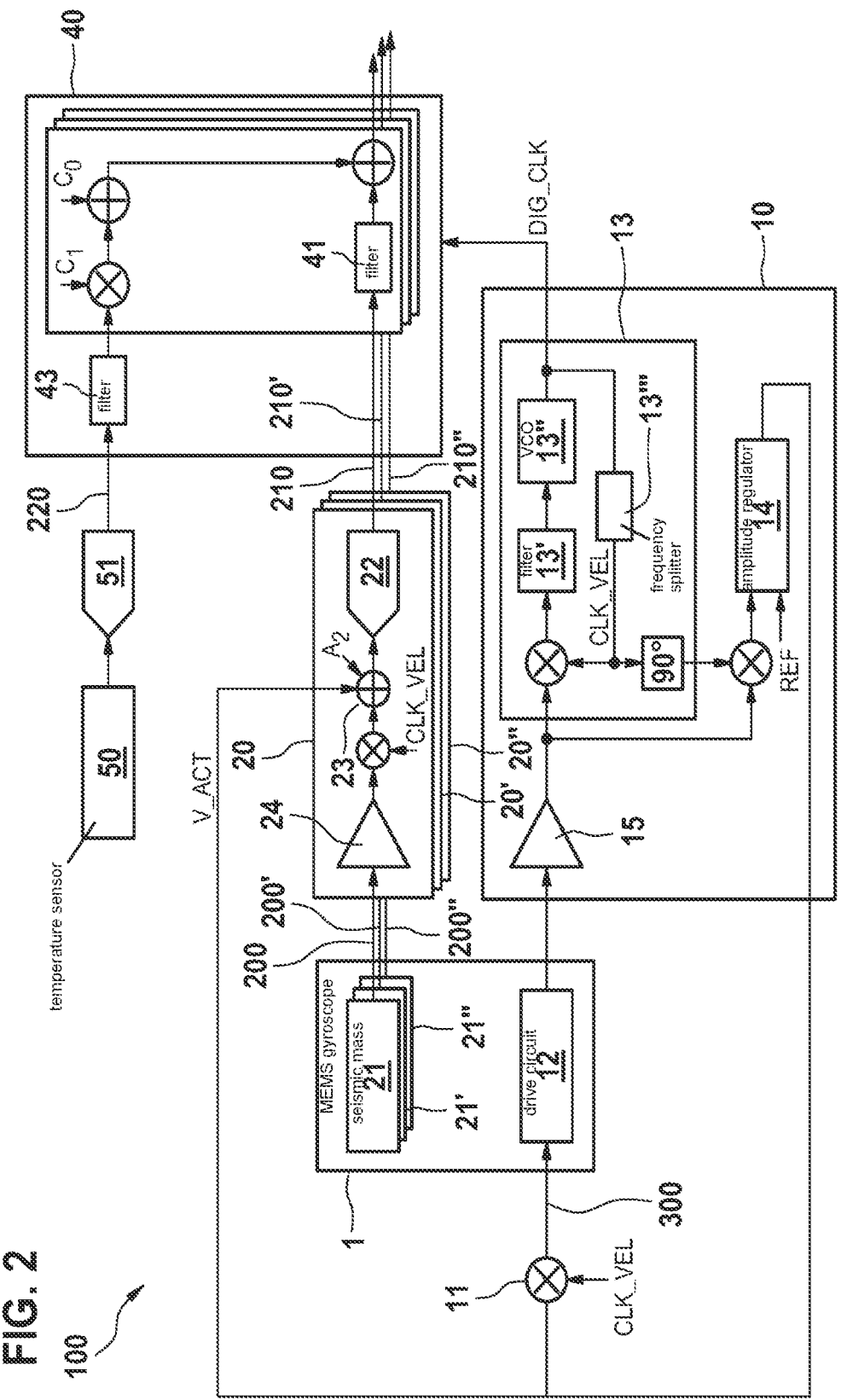
FIG. 2 is a schematic illustration of a sensor system according to a second exemplary embodiment of the present invention.

FIG. 2 is a schematic illustration of a sensor system 100 according to a second exemplary embodiment of the present invention. In the second exemplary embodiment, unlike the first exemplary embodiment in FIG. 1 the offset of the angular rate signal 210 is compensated for in the analog detection circuit 200 after the analog angular rate signal has been obtained from the measurement signal 200 by the demodulation apparatus 23. The compensation is thus carried out before the angular rate signal is digitalized by the analog-to-digital converter 22. In this case, the offset is compensated for with the help of and on the basis of the drive voltage, V_Act, output by the amplitude regulator 14. For the purpose of the offset compensation, the weighted drive voltage, V_Act, is preferably applied to the angular rate signal using one or more coefficients A2. Once the analog angular rate signal compensated for in this manner has been digitalized, it is possible for a temperature-dependent compensation on the basis of the digitalized temperature information from the temperature sensor 50 to be additionally performed in the digital processing circuit 40.

The offset of the angular rate signal owing to parasitic capacitive couplings, as described as part of the specific embodiments and exemplary embodiments, is separate from offsets induced by quadrature effects. The compensation of the offsets induced by parasitic capacitances as proposed according to the present invention can thus be combined with other compensation methods for compensating for quadrature-induced offsets.

What is claimed is:

1. A sensor system including a MEMS gyroscope, comprising:
   a seismic mass, which can be excited to vibrate and has at least one electrode assembly for capacitively detecting a measurement signal;
   a drive circuit configured to generate a drive voltage or exciting and maintaining a defined vibratory movement of the seismic mass, there being a parasitic capacitive coupling between the drive circuit and the at least one electrode assembly,
   a detection circuit configured to read out the measurement signal and to generate an angular rate signal based on the measurement signal;
   a circuit configured to compensate for an offset of the angular rate signal based the drive voltage; and
   a digital processing circuit configured to compensate for an offset of an angular rate signal in digitalized form based on the drive voltage in digitalized form.

2. The sensor system as recited in claim 1, wherein the circuit is configured to apply a weighted or unweighted drive voltage to the angular rate signal in analog form for the offset compensation, the offset compensation occurring prior to digitalization of the angular rate signal.

3. The sensor system as recited in claim 1, further comprising:
   at least one temperature sensor configured to detect temperature information; and
   wherein the digital processing circuit is configured to compensate for the offset of the digitalized angular rate signal additionally based on the temperature information in digitized form.

4. The sensor system as recited in claim 3, wherein the digital processing circuit is configured to apply a compensation offset to the digitalized angular rate signal, and the digital processing circuit is configured to generate the compensation offset by linking the digitalized temperature information T and the digitalized drive voltage V_Act in accordance with a predetermined functional relationship.

5. The sensor system as recited in claim 1, wherein:
   the MEMS gyroscope is configured for measurements in at least two independent directions in space,
   the MEMS gyroscope includes at least two drivable seismic masses for detecting at least two measurement signals, wherein the at least two seismic masses are excited to move in a vibratory manner in respective independent directions in space, and a shared drive circuit is provided for the at least two seismic masses, and
   the MEMS gyroscope is configured such that at least two angular rate signals are generated for at least two independent directions in space based on the at least two measurement signals, and
   for the offset compensation, the circuit is configured to use the drive voltage generated by the shared drive circuit to compensate for an offset of the at least two angular rate signals, the offset being compensated for separately for each of the at least two angular rate signals.

6. A method for compensating for an offset of an angular rate signal that has been detected and generated using a sensor system including a MEMS gyroscope, the MEMS gyroscope including:
   a seismic mass, which can be excited to vibrate and has at least one electrode assembly for capacitively detecting a measurement signal,
   a drive circuit configured to generate a drive voltage for exciting and maintaining a defined vibratory movement of the seismic mass, there being a parasitic capacitive coupling between the drive circuit and the at least one electrode assembly, and
   a detection circuit configured to read out the measurement signal and to generate an angular rate signal based on the measurement signal,
wherein the method includes:
   providing the sensor system;
   compensating for the offset based on the drive voltage; and
   a digital processing circuit configured to compensate for an offset of an angular rate signal in digitalized form based on the drive voltage in digitalized form.

7. The method as recited in claim 6, wherein a weighted or unweighted drive voltage is applied to the angular rate signal in analog form for the offset compensation, the offset compensation occurring prior to digitalization of the angular rate signal.

8. The method as recited in claim 6, wherein temperature information is detected and digitalized and is used for compensating for the offset of the angular rate signal in digitalized form.

9. The method as recited in claim 8, wherein a compensation offset, Rate_Offset, is applied to the digitalized angular rate signal, and the compensation offset, Rate_Offset, is generated by linking the digitalized temperature information, T, and the drive voltage in digitalized form V_Act in accordance with a predetermined functional relationship.

10. A sensor system including a MEMS gyroscope, comprising:
   a seismic mass, which can be excited to vibrate and has at least one electrode assembly for capacitively detecting a measurement signal;
   a drive circuit configured to generate a drive voltage or exciting and maintaining a defined vibratory movement of the seismic mass, there being a parasitic capacitive coupling between the drive circuit and the at least one electrode assembly, a detection circuit configured to read out the measurement signal and to generate an angular rate signal based on the measurement signal;

a circuit configured to compensate for an offset of the angular rate signal based the drive voltage; and at least one temperature sensor configured to detect temperature information, wherein the digital processing circuit is configured to apply a compensation offset to the digitalized angular rate signal, and the digital processing circuit is configured to generate the compensation offset by linking the digitalized temperature information T and the digitalized drive voltage V_Act in accordance with a predetermined functional relationship, wherein the digital processing circuit is configured to compensate for the offset of the digitalized angular rate signal additionally based on the temperature information in digitized form, wherein the digital processing circuit is configured to apply a compensation offset, Rate_Offset, to the digitalized angular rate signal, the compensation offset being expressed as:

Rate_Offset=$(c0+c1*T+c2*T2)*V\_Act$, where c0, c1, and c2 are coefficients determined in advance.

11. A method for compensating for an offset of an angular rate signal that has been detected and generated using a sensor system including a MEMS gyroscope, the MEMS gyroscope including:

a seismic mass, which can be excited to vibrate and has at least one electrode assembly for capacitively detecting a measurement signal, a drive circuit configured to generate a drive voltage for exciting and maintaining a defined vibratory movement of the seismic mass, there being a parasitic capacitive coupling between the drive circuit and the at least one electrode assembly, and a detection circuit configured to read out the measurement signal and to generate an angular rate signal based on the measurement signal, wherein the method includes:

providing the sensor system; and compensating for the offset based on the drive voltage, wherein a compensation offset, Rate_Offset, is applied to the digitalized angular rate signal, and the compensation offset, Rate_Offset, is generated by linking the digitalized temperature information, T, and the drive voltage in digitalized form V_Act in accordance with a predetermined functional relationship, wherein temperature information is detected and digitalized and is used for compensating for the offset of an angular rate signal in digitalized form, wherein the compensation offset, Rate_Offset, is determined as:

Rate_Offset=$(c0+c1*T+c2*T2)*V\_Act$, where c0, c1, and c2 are coefficients determined in advance.

* * * * *